United States Patent
Hessbrueggen

(10) Patent No.: US 9,302,361 B2
(45) Date of Patent: Apr. 5, 2016

(54) SELF-LOADING MACHINING APPARATUS WITH A VERTICAL SPINDLE

(75) Inventor: Norbert Hessbrueggen, Salach (DE)

(73) Assignee: EMAG HOLDING GMBH, Salach (DE)

( * ) Notice: Subject to any disclaimer, the term of this patent is extended or adjusted under 35 U.S.C. 154(b) by 794 days.

(21) Appl. No.: 13/477,252

(22) Filed: May 22, 2012

(65) Prior Publication Data

US 2012/0301253 A1    Nov. 29, 2012

(30) Foreign Application Priority Data

May 27, 2011    (DE) .......................... 10 2011 103 321

(51) Int. Cl.
| | |
|---|---|
| *B65G 65/00* | (2006.01) |
| *B23Q 7/04* | (2006.01) |
| *B23Q 11/08* | (2006.01) |
| *B23Q 39/02* | (2006.01) |
| *B23Q 39/00* | (2006.01) |

(52) U.S. Cl.
CPC ............ *B23Q 7/047* (2013.01); *B23Q 11/0891* (2013.01); *B23Q 39/024* (2013.01); *B23Q 2039/008* (2013.01); *Y10T 29/5109* (2015.01); *Y10T 82/2511* (2015.01); *Y10T 82/2514* (2015.01)

(58) Field of Classification Search
CPC .. B23Q 7/047; B23Q 11/0891; B23Q 39/024; B23Q 2039/008

USPC .......................................... 414/225.01, 749.1
See application file for complete search history.

(56) References Cited

U.S. PATENT DOCUMENTS

| | | | |
|---|---|---|---|
| 6,718,229 B1 * | 4/2004 | Takebayashi et al. ........ | 700/217 |
| 7,476,072 B2 * | 1/2009 | Tamura ...................... | 414/749.1 |
| 2003/0143048 A1 * | 7/2003 | Sugata et al. ................. | 409/137 |
| 2006/0194682 A1 * | 8/2006 | Sugata et al. ..................... | 483/3 |
| 2007/0078043 A1 * | 4/2007 | Yoshida ............................. | 483/3 |
| 2009/0145030 A1 * | 6/2009 | Landerer ........................... | 49/41 |
| 2009/0324354 A1 * | 12/2009 | Hara et al. ..................... | 409/134 |

FOREIGN PATENT DOCUMENTS

| | | | | |
|---|---|---|---|---|
| DE | 19734301 C1 * | 8/1998 | ............ | B23Q 7/047 |
| DE | 102004005498 A | 8/2005 | | |

\* cited by examiner

*Primary Examiner* — Scott Lowe
(74) *Attorney, Agent, or Firm* — Andrew Wilford

(57) ABSTRACT

An apparatus for machining workpieces has a frame having a vertical front wall and defining a work station, an intake station, and an output station. Conveyors move the workpieces into the intake station and out of the output station. At least one tool is provided in the work station. A vertical guide on the front wall carries a vertical slide movable vertically by a drive. A horizontal guide on the vertical slide extends along the working, intake, and output stations and carries a horizontal slide movable by another drive means along the horizontal guide. A workpiece holder/grab rotatable about a vertical axis on the horizontal slide is shiftable between respective positions alignable with the working, intake, and output stations on movement of the horizontal slide along the horizontal guide.

10 Claims, 2 Drawing Sheets

SELF-LOADING MACHINING APPARATUS WITH A VERTICAL SPINDLE

FIELD OF THE INVENTION

The present invention relates to a machining apparatus. More particularly this invention concerns such an apparatus that can automatically load, machine, and unload workpieces.

BACKGROUND OF THE INVENTION

A typical machining apparatus has a frame having a vertical front wall and defining a work station, an intake station, and an output station. Conveyors can move the workpieces into the intake station and out of the output station. The work station holds at least one tool. vertical and horizontal guides support respective vertical and horizontal slides. A workpiece holder/grab carried on one of the slides is rotatable about a vertical axis and movable between a position alignable with the working, intake, and output stations on movement of the horizontal slide along the horizontal guide. Thus one of the workpiece can be shifted from the intake station into the work station, machined by the tool in the work stations, and deposited after machining in the output station, all while being held in the workpiece holder/grab, which typically is a three- or four-point chuck.

Such an apparatus using the pick-up principle is known in numerous designs, for instance form De 10 2004 005 498. They all have in common that the workpiece spindle is can be moved on a slide along horizontal guides on the machine frame so as to removes an unmachined workpiece from a conveyor, transfers it to the work station and subsequently deposits them again on the same or a different conveyor. On the upper frame of this machine, a horizontal guide is provided for the horizontal slide on which the vertical slide with the workpiece holder/grab can be vertically moved. The horizontal guide on the upper frame extends on both sides laterally beyond the working station so that the workpiece carrier can be moved on the one side into a workpiece intake position and on the other side into a workpiece output position. This results necessarily in a widely extended machine frame.

OBJECTS OF THE INVENTION

It is therefore an object of the present invention to provide an improved self-loading machining apparatus with a vertical spindle.

Another object is the provision of such an improved self-loading machining apparatus with a vertical spindle that overcomes the above-given disadvantages, in particular that has a compact design and improved machine rigidity.

SUMMARY OF THE INVENTION

An apparatus for machining workpieces has according to the invention a frame having a vertical front wall and defining a work station, an intake station, and an output station. Conveyors move the workpieces into the intake station and out of the output station. At least one tool is provided in the work station. A vertical guide on the front wall carries a vertical slide movable vertically by a drive. A horizontal guide on the vertical slide extends along the working, intake, and output stations and carries a horizontal slide movable by another drive means along the horizontal guide. A workpiece holder/grab rotatable about a vertical axis on the horizontal slide is shiftable between respective positions alignable with the working, intake, and output stations on movement of the horizontal slide along the horizontal guide so that one of the workpiece can be shifted from the intake station into the work station, machined by the tool in the work stations, and deposited after machining in the output station.

Since there is a vertical guide for the vertical slide on the machine frame, this frame can be constructed particularly slim as a column. The vertical slide for its part carries horizontal guides for the workpiece carrier. The vertical slide is built wide enough that the workpiece spindle can be moved from at least one working position into a loading and unloading position. The vertical guides are arranged behind the working station so that in the region of the working position, despite the widely protruding vertical slide, the required machine rigidity is always ensured. In the peripheral regions of the vertical slide in which the loading takes place, the machine rigidity is not relevant.

BRIEF DESCRIPTION OF THE DRAWING

The above and other objects, features, and advantages will become more readily apparent from the following description, reference being made to the accompanying drawing in which.

DETAILED DESCRIPTION

Figure 1:
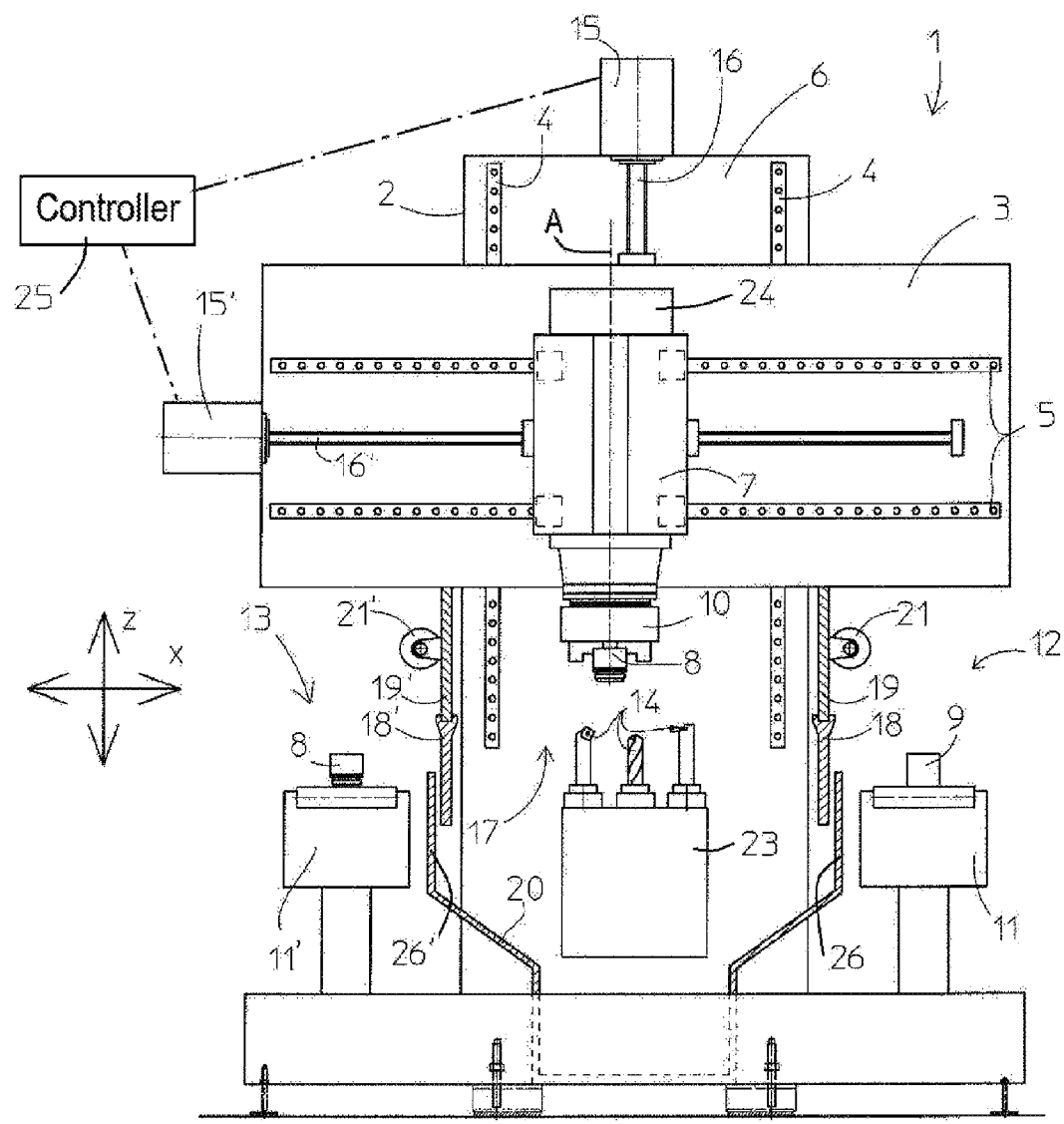
FIG. 1 is a front view of the machining apparatus according to the invention.
Figure 2:
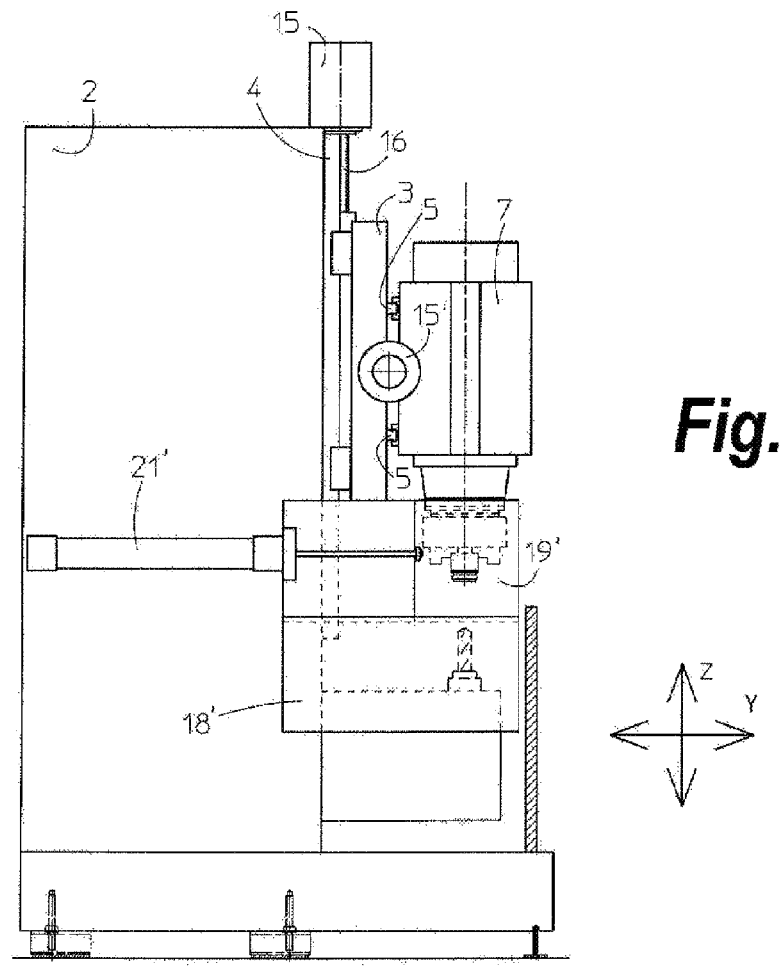
FIG. 2 is a side view of the apparatus with the panel of the shield wall closed.
Figure 3:
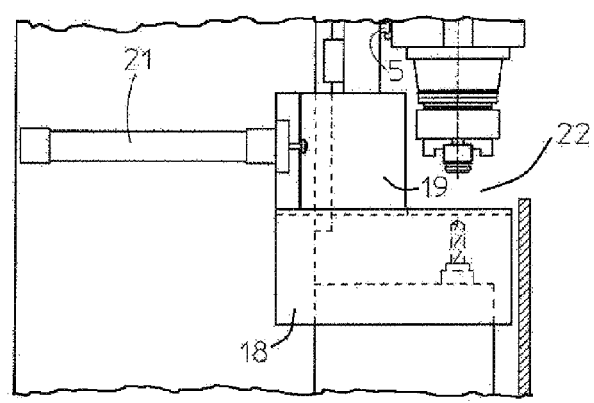
FIG. 3 is a side-view detail showing the panel open.

As seen in FIGS. 1-3 a machining apparatus 1 has a frame 2 formed as a square-section column in turn having a flat front wall 6 extending parallel to a horizontal X-direction and a vertical Z-direction. Vertical guide rails 4 on the front wall 6 carry a flat and horizontally elongated vertical slide 3 that can move in the vertical Z-direction on the guides 4. Horizontal guide rails 5 on a front face of the vertical slide 3 carry a horizontal slide 24 of a horizontal dimension equal to about one-fifth that of the vertical slide 3 and shiftable in the horizontal X-direction. A spindle unit 7 having its own motor carries a grab/holder 10, here a multijaw chuck, for rotation about a vertical axis A. Drive motors 15 and 15' respectively carried on the frame 2 and vertical slide 3 are connected via respective ball spindles 16 and 16' to the vertical slide 3 and the horizontal slide 24 for moving them respectively vertically and horizontally, as directed by a computer-type controller 25.

Underneath the vertical slide 3, the apparatus 1 has an intake station 12 to which unmachined workpieces 9 are fed in a horizontal Y-direction perpendicular to the view plane of FIG. 1 and on the opposite side an output station 13 with another such conveyor 11' that can take machined workpieces 8 horizontally away. Between the intake station 12 and output station 13 is a work station 17 having a turret or drive/holder 23 on which are carried tools 14, for instance lathing cutters or drill bits, that may be rotated by an unillustrated drive in the turret 23. The vertically but not horizontally shiftable slide 3 extends above all three of the stations 12, 13, and 17.

While the stations 12 and 13 are here shown to laterally flank the work station 17, in fact they could both be to one side, with for instance the output station 13 between the intake station 12 and the work station 17. No matter what the orientation, the slide 3 has a width not exceeding the dimension in the X-direction of the three stations 12, 13, and 17 so that it does not project horizontally therepast in any position of the horizontal slide 24 or spindle unit 7. The apparatus 1 therefore has a fairly compact footprint.

During normal operation in this apparatus the chuck 10 can be raised and lowered in any of the stations 12, 13, and 17 by raising and lowering the slide 3 and can be horizontally shifted between the stations 12, 13, and 17 by movement of the horizontal slide 24 on the horizontally nonmoving vertical slide 3. The central computer-type controller 25 is connected to both of the slide-drive motors 15 and 15' as well as to the drive spindle 7 that rotates the chuck 10 and an unillustrated actuator that opens and closes the chuck 10 so as to:

1. Pick an unmachined workpiece up from the conveyor 11 in the station 12.
2. Move it horizontally to the station 17.
3. Lower it while relatively rotating it and one of the tools 14 to appropriately machine the workpiece 9.
4. Then raise the finished machined workpiece 8, transport it horizontally to the station 13, and deposit it there on the conveyor 11'.

Underneath the work station 17 is an upwardly open funnel-shaped bin 20 adapted to catch particles generated by the machining processes in the work station 17. This bin 20 has side walls 26 and 26' that are planar and that have upper edges below the path traveled by the workpieces 8 and 9 as they move horizontally in the X-direction into and out of the work station 17.

The vertical slide 3 carries two shield walls 18 and 18' that extend in the horizontal Y-direction perpendicular to the vertical Z-direction and horizontal X-direction and that each lie between the work station 17 and a respective one of the intake and output stations 12 and 13. Each of the walls 18 and 18' is formed with a cutout 22 (FIG. 3 only) that can be closed by a respective panel 19 or 19' operated by a respective actuator 21 or 21', here a fluid-operated cylinder fixed to the respective wall 18 or 18'. The shield walls 18 and 18' are more closely spaced in the horizontal X-direction than the respective bin walls 26 and 26' and have lower edges below the upper edges of these walls 26 and 26'. Thus when the panels 19 and 19' are in the closed position covering the cutouts 22, any particles flying off the workpiece 9 being machined in the station 17 will be deflected downward into the bin 21 and will not fly out and get onto the conveyors 11 or 11'. On the other hand, when the panels 19 and 19' are retracted and the slide 3 is raised to lift the lower edges of the walls 18 and 18' above the upper edges of the walls 26 and 26', the slide 24 can move back and forth and shift workpieces 8 and 9 through the cutouts 22 out of the intake station 12, into the work station 17, and from there into the output station 13.

I claim:

1. An apparatus for machining workpieces, the apparatus comprising:
    a frame having a vertical front wall and defining a work station, an intake station, and an output station offset from each other in a predetermined horizontal direction with the work station between the intake and output stations;
    conveyor means for moving the workpieces into the intake station and out of the output station;
    at least one tool in the work station;
    a vertical guide on the front wall;
    a vertical slide on the vertical guide above the work, intake, and output stations;
    two vertical shield walls carried on and vertically displaceable with the vertical slide, flanking the work station, each extending generally perpendicular to the direction, and each separating the work station from a respective one of the intake and output stations;
    vertical drive means connected between the vertical slide and the frame for vertically shifting the vertical slide along the vertical guide;
    a horizontal guide on the vertical slide and extending along and above the work, intake, and output stations in the horizontal direction;
    a horizontal slide on the horizontal guide;
    horizontal drive means connected between the vertical slide and the horizontal slide for horizontally shifting the horizontal slide along the horizontal guide above the work, intake, and output stations in the horizontal direction; and
    a workpiece holder/grab rotatable about a vertical axis on the horizontal slide and shiftable horizontally between respective positions alignable with the work, intake, and output stations on movement of the horizontal slide along the horizontal guide such that one of the workpieces can be shifted from the intake station into the work station, machined by the tool in the work stations, and deposited after machining in the output station.

2. The machining apparatus defined in claim 1, wherein the vertical shield walls each include a panel shiftable horizontally on the vertical slide between a closed position between the work station and the respective one of the input and output stations so as to prevent particles generated in the work station from getting into the input and output stations and an open position permitting the workpiece holder/grab to travel between the work station and the input and output stations.

3. The machining apparatus defined in claim 2, further comprising:
    means for horizontally shifting the panels between the open and closed positions.

4. The machining apparatus defined in claim 3, further comprising:
    a particle bin below the work station oriented to catch the particles generated in the work station by a machining operation therein.

5. The machining apparatus defined in claim 4, wherein each vertical shield wall has a lower edge within the particle bin and below an upper edge of the particle bin.

6. The machining apparatus defined in claim 5, wherein the holder/grab rotates the workpiece about the vertical axis.

7. The machining apparatus defined in claim 1, wherein the front wall extends parallel to the horizontal direction.

8. The machining apparatus defined in claim 1, wherein the vertical slide has a horizontal length in the horizontal direction such that it extends above all of the work, intake, and output stations.

9. The machining apparatus defined in claim 8, wherein the vertical slide is movable only vertically relative to the frame.

10. The machining apparatus defined in claim 1, wherein the work station is between the intake and output stations and the horizontal guide projects horizontally parallel to the plane past the frame above the intake station and above the output station.

* * * * *